(12) United States Patent
Swaminathan et al.

(10) Patent No.: US 11,401,793 B2
(45) Date of Patent: Aug. 2, 2022

(54) OPTIMIZING PROPPANT PLACEMENT FOR FRACTURING OPERATIONS

(71) Applicant: HALLIBURTON ENERGY SERVICES, INC., Houston, TX (US)

(72) Inventors: Tirumani N. Swaminathan, Houston, TX (US); Jianlei Sun, Katy, TX (US); Paul M. Ashcraft, Cypress, TX (US); Cesar Edmundo Meza, Pearland, TX (US); Aaron Gene Russell, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/293,456

(22) PCT Filed: Nov. 29, 2018

(86) PCT No.: PCT/US2018/063125
§ 371 (c)(1),
(2) Date: May 12, 2021

(87) PCT Pub. No.: WO2020/112121
PCT Pub. Date: Jun. 4, 2020

(65) Prior Publication Data
US 2021/0404306 A1 Dec. 30, 2021

(51) Int. Cl.
*E21B 43/267* (2006.01)
*E21B 43/14* (2006.01)
(Continued)

(52) U.S. Cl.
CPC ............ *E21B 43/267* (2013.01); *E21B 43/14* (2013.01); *E21B 43/2607* (2020.05); *E21B 49/0875* (2020.05); *E21B 2200/20* (2020.05)

(58) Field of Classification Search
CPC .... E21B 43/267; E21B 43/26; E21B 41/0092; E21B 49/00; E21B 2200/20; G06F 2111/10
See application file for complete search history.

(56) References Cited

U.S. PATENT DOCUMENTS

| 4,828,028 A | 5/1989 | Soliman |
| 2003/0050758 A1 | 3/2003 | Soliman et al. |

(Continued)

FOREIGN PATENT DOCUMENTS

WO   WO-2017066718 A1 *   4/2017   ............. C09K 8/604

OTHER PUBLICATIONS

Korean Intellectual Patent Office, International Search Report and Written Opinion, PCT/US2018/063125, dated Aug. 12, 2019, 9 pages, Korea.

*Primary Examiner* — Zakiya W Bates
(74) *Attorney, Agent, or Firm* — Haynes and Boone, LLP (57) ABSTRACT

System and methods of optimizing proppant placement for stimulation treatments are provided. Properties of a reservoir formation and a treatment fluid to be injected into the formation are determined for a multistage stimulation treatment to be performed along a wellbore drilled within the formation. A proppant transport model uses the properties to determine a proppant profile for a fractured area of the formation for each treatment stage along the wellbore. A proppant pack conductivity for each stage is determined based on a proppant conductivity model and the proppant profile for that stage. A rate of hydrocarbon production expected from the wellbore is estimated based on a well production model and the proppant pack conductivity. A distribution of proppant to be injected into the formation during the treatment is determined, based on the production (Continued)

rate and one or more constraints. The stimulation treatment is performed based on the determined proppant distribution.

20 Claims, 6 Drawing Sheets

(51) Int. Cl.
*E21B 49/00* (2006.01)
*E21B 49/08* (2006.01)
*E21B 43/26* (2006.01)

(56) References Cited

U.S. PATENT DOCUMENTS

| | | |
|---|---|---|
| 2008/0149329 A1 | 6/2008 | Cooper et al. |
| 2015/0233214 A1 | 8/2015 | Dusterhoft et al. |
| 2016/0139588 A1 | 5/2016 | Huang et al. |

* cited by examiner

OPTIMIZING PROPPANT PLACEMENT FOR FRACTURING OPERATIONS

CROSS-REFERENCE TO RELATED APPLICATIONS

This application is a U.S. national stage patent application of International Patent Application No. PCT/US2018/063125, filed on Nov. 29, 2018, the benefit of which is claimed and the disclosure of which is incorporated herein by reference in its entirety.

FIELD OF THE DISCLOSURE

The present disclosure relates generally to fluid injection treatments for stimulating hydrocarbon production from subsurface reservoir formations, and particularly, to the placement and distribution of proppant during such stimulation treatments.

BACKGROUND

Fracturing treatments are commonly used in downhole operations, among other purposes, to stimulate the production of hydrocarbons (e.g., oil and natural gas) from a subterranean formation. For example, hydraulic fracturing treatments generally involve injecting a treatment fluid (e.g., a fracturing fluid) into the formation via injection points or perforations along a wellbore drilled within the formation. The treatment fluid may be injected or pumped at a sufficient hydraulic pressure to create or enhance one or more fractures that propagate from the perforations through the surrounding formation. The creation and/or enhancement of these fractures may enhance hydrocarbon production from the subterranean formation.

In order to maintain and/or enhance the conductivity of a fracture in a subterranean formation, proppant may be deposited in the fracture, for example, by introducing a high viscosity fracturing fluid carrying proppant particles into the subterranean formation. The proppant may prevent the fractures from fully closing upon the release of hydraulic pressure, forming conductive channels through which fluids may flow to the wellbore. Traditionally, operational decisions related to the use of proppant for a given treatment stage, including when and how much proppant is used, are made a priori according to a predefined treatment schedule. However, conventional stimulation techniques based on such predefined proppant schedules fail to account for actual operating conditions that affect the downhole flow distribution of the proppant over the course of the stimulation treatment.

DESCRIPTION OF ILLUSTRATIVE EMBODIMENTS

Embodiments of the present disclosure relate to optimizing proppant placement for hydraulic fracturing or stimulation treatment operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

As will be described in further detail below, embodiments of the present disclosure may be used to optimize proppant placement for fracturing operations performed along a wellbore drilled within a reservoir formation. Such a fracturing operation may be, for example, a multistage stimulation treatment. The multistage stimulation treatment may involve injecting treatment fluid into the formation via perforations corresponding to different stages of the stimulation treatment. The perforation for each stage may include one or more injection points along a corresponding portion of the wellbore within the formation. In some cases, multiple injection points or perforations that form a perforation cluster may be used to perform each stage of the stimulation treatment along the wellbore. The treatment fluid injected through the perforation(s) at each stage of the stimulation treatment may include a fracturing fluid for creating one or more fractures within an area of the formation area surrounding a corresponding portion of the wellbore. The treatment fluid may also include a proppant for preventing the closure of the fracture(s) by "propping" them open. By preventing the fractures from closing, the distribution of proppant within each fracture may be an important factor that affects hydrocarbon production and the resistance of hydrocarbon flow paths within the formation or fractured area thereof.

In one or more embodiments, a combination of various models may be used to determine an optimal distribution of proppant along the wellbore so as to improve hydrocarbon production over a desired time period. Such models may include, but are not limited to, a proppant transport model, a proppant conductivity model, and a well production model. As will be described in further detail below, these models may take into account various reservoir and treatment properties along with a number of external factors to determine an optimized schedule for injecting proppant into a fracture or fractured area of the formation at each stage of the stimulation treatment along the wellbore. Such external factors may include, for example, a set of operational constraints and/or proppant preferences, e.g., as specified by a well operator or reservoir engineer according to a baseline treatment plan or proppant injection schedule. Examples of such constraints or preferences include, but are not limited to, proppant volume, size, type, costs, availability, and any other parameter related to the properties and/or loading characteristics of the proppant. In one or more embodiments, such constraints may also include one or more economic constraints, e.g., maximization of Initial Production (IP) in the short-term or Estimated Ultimate Recovery (EUR) over the long-term, which may be specified by the treatment plan as a target production rate for a particular time period. As will be described in further detail below, the disclosed optimization techniques may be used to determine an optimized proppant schedule, which improves overall well productivity without increasing the total cost of the proppant to be injected at each stage, e.g., by improving the overall well productivity without affecting the total cost of the proppant or by substantially reducing the cost while maintaining productivity. This allows the overall objective, e.g., optimized proppant distribution and improved well productivity, to be achieved for a greater return on investment.

Illustrative embodiments and related methodologies of the present disclosure are described below in reference to FIGS. 1-6 as they might be employed, for example, in a computer system for controlling proppant distribution and placement during a stimulation treatment along a wellbore within a reservoir formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
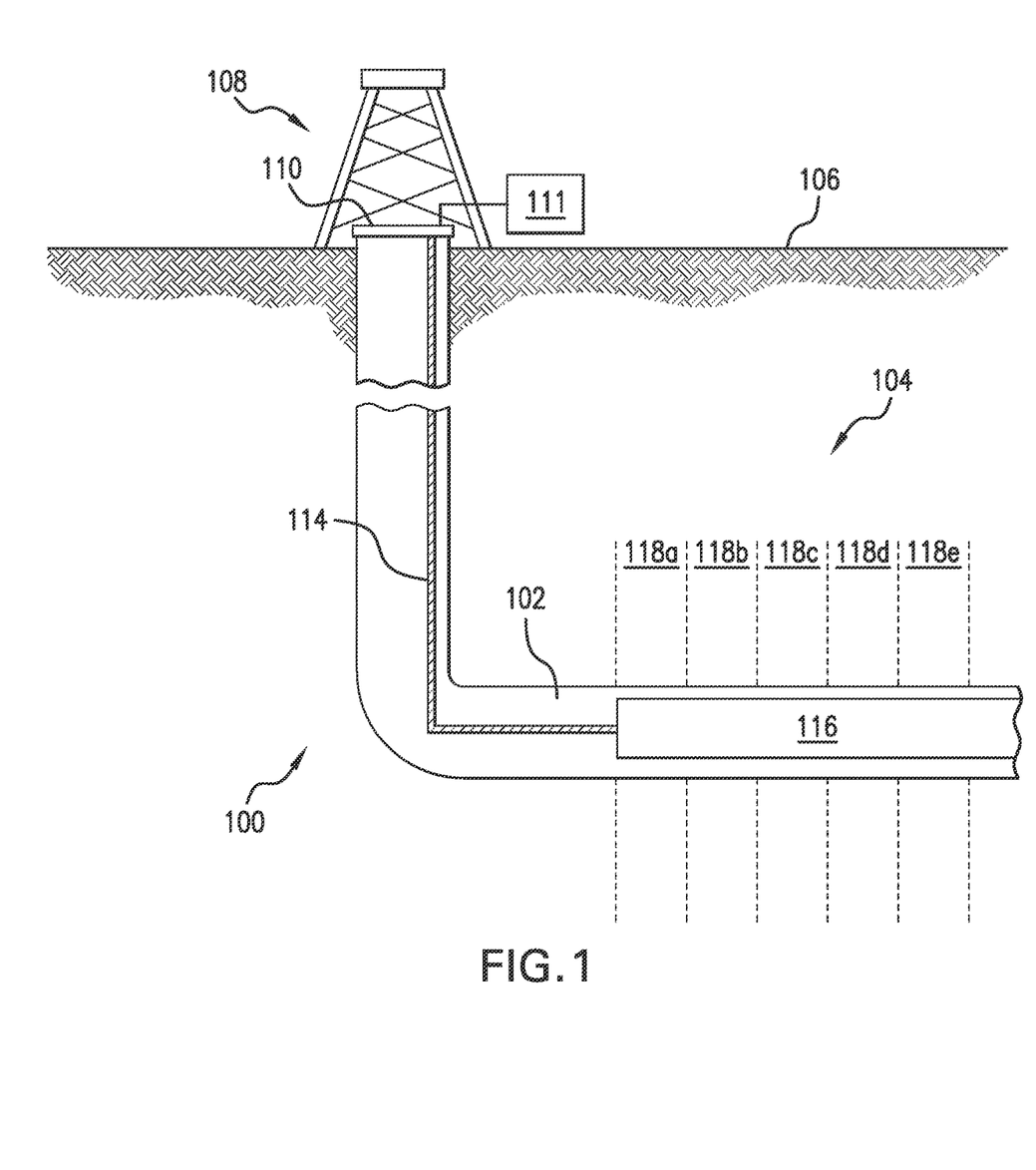
FIG. 1 is a diagram of an illustrative wellbore system for performing a multistage stimulation treatment along a wellbore within a subsurface reservoir formation.

FIG. 1 is a diagram of an illustrative wellbore system 100 for performing a multistage stimulation treatment along a wellbore within a subsurface reservoir formation. As shown in the example of FIG. 1, wellbore system 100 includes a wellbore 102 in a subsurface formation 104 beneath a surface 106 of the wellsite. Although wellbore 102 is shown in the example of FIG. 1 as a horizontal wellbore, it should be appreciated that embodiments of the present disclosure are not limited thereto and that the disclosed diversion control techniques may be applied to wellbores in any orientation including, but not limited to, horizontal, vertical, slant, curved, and/or a combination thereof. The subsurface formation 104 in this example may include a reservoir of hydrocarbon deposits, such as oil, natural gas, and/or others. For example, the subsurface formation 104 may be a rock formation (e.g., shale, coal, sandstone, granite, and/or others) that includes oil and natural gas deposits trapped within one or more layers of the formation. In some cases, the subsurface formation 104 may be a tight gas formation that includes low permeability rock (e.g., shale, coal, and/or others). The subsurface formation 104 may be composed of naturally fractured rock and/or rock formations that are not fractured to any significant degree.

In one or more embodiments, wellbore system 100 may also include a fluid injection system 108 for injecting treatment fluid into different areas of the subsurface formation 104 over multiple stages or intervals 118a, 118b, 118c, 118d, and 118e (collectively referred to herein as "intervals 118") along the wellbore 102, as will be described in further detail below. The boundaries of the respective intervals 118 and corresponding treatment stages/intervals along the length of the wellbore 102 may be delineated by, for example, the locations of bridge plugs, packers and/or other types of equipment in the wellbore 102. Additionally or alternatively, the intervals 118 and corresponding treatment stages may be delineated by particular features of the subsurface formation 104. Although five intervals are shown in FIG. 1, it should be appreciated that any number of intervals and/or treatment stages may be used as desired for a particular implementation. Furthermore, each of the intervals 118 may have the same or different widths and may be uniformly spaced along the wellbore 102 or as desired for a particular implementation.

As shown in FIG. 1, injection system 108 in this example includes an injection control subsystem 111 located at the surface 106 of the wellsite along with a signaling subsystem 114 and one or more injection tools 116 within the wellbore 102. The injection control subsystem 111 may communicate with the injection tools 116 from a surface 110 of the wellbore 102 via the signaling subsystem 114. Although not shown in FIG. 1, injection system 108 may include additional and/or different features for implementing each stage of the stimulation treatment along the wellbore 102. For example, the injection system 108 may include any number of computing subsystems, communication subsystems, pumping subsystems, monitoring subsystems, and/or other features as desired for a particular implementation. In some implementations, the injection control subsystem 111 may be communicatively coupled to a remote computing system (not shown) for exchanging information via a network for purposes of monitoring and controlling wellsite operations, including operations related to the stimulation treatment. Such a network may be, for example and without limitation, a local area network, medium area network, and/or a wide area network, e.g., the Internet.

During each stage of the stimulation treatment, the injection system 108 may alter stresses and create a multitude of fractures in the subsurface formation 104. As will be described in further detail below with respect to FIG. 2, such fractures may be created by injecting treatment fluid (e.g., hydraulic fracturing fluid) into the surrounding subsurface formation 104 via a plurality of injection points along portions of the wellbore 102 corresponding to intervals 118. The fluid may be injected through any combination of one or more valves of the injection tools 116. The injection tools 116 may include numerous components including, but not limited to, valves, sliding sleeves, actuators, ports, and/or other features that communicate treatment fluid from a working string disposed within the wellbore 102 into the subsurface formation 104 via the injection points. The injection points along the wellbore 102 may be, for example, open-hole sections along an uncased portion of the wellbore path, a series of perforations along a cased portion of the wellbore, ports of a sliding sleeve completion device along the wellbore, slots of a perforated liner along the wellbore, or any combination of the foregoing.

In one or more embodiments, the treatment fluid injected into the formation 104 using injection tools 116 may include a combination of fracturing fluid and proppant. The proppant may be, for example, particles of proppant material suspended within and carried by the fracturing fluid injected into the formation. Examples of such proppant material include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and any other suitable proppant material as desired for a particular implementation. The fracturing fluid may be, for example, an aqueous based fluid with any number of additives used to modify fluid properties, e.g., increase fluid viscosity and thereby reduce particle sedimentation due to gravity. However, it should be appreciated that any of various injection or "carrier" fluids (e.g., energized fluids, foams, etc.) may be used as desired for a particular implementation to carry the proppant downhole. Examples of additives that may be used with the fracturing fluid include, but are not limited to, acids, fluid loss control additives, foaming agents, gas, corrosion inhibitors, catalysts, friction reducers, antifoam agents, bridging agents, dispersants, flocculants, gelling agents, lubricants, salts, CO2 scavengers, H2S scavengers, oxygen scavengers, weighting agents, and any other suitable additive as desired for a particular implementation.

In one or more embodiments, the components of injection tools 116, e.g., valves, ports, and/or sliding sleeves, may be configured or reconfigured to control the location, rate, orientation, and/or other properties of the treatment fluid being injected into the subsurface formation 104 at each stage of the stimulation treatment along the wellbore 102. The various components of injection tools 116 may be coupled by sections of tubing, pipe, or another type of conduit. The injection tools may be isolated in the wellbore 102 by packers or other devices installed in the wellbore 102.

In one or more embodiments, the injection system 108 may be used to create or modify a complex fracture network in the subsurface formation 104 by injecting fluid into area of the subsurface formation 104 where stress has been altered. For example, the complex fracture network may be created or modified after an initial injection treatment has altered stress by fracturing the subsurface formation 104 at multiple locations along the wellbore 102. After the initial injection treatment alters stresses in the subterranean formation, one or more valves of the injection tools 116 may be selectively opened or otherwise reconfigured to stimulate or re-stimulate specific areas of the subsurface formation 104 along one or more intervals 118 of the wellbore 102, taking advantage of the altered stress state to create complex fracture networks. In some cases, the injection system 108 may be used to inject treatment fluid simultaneously for multiple intervals 118 of wellbore 102.

The operation of the injection tools 116 may be controlled by the injection control subsystem 111. The injection control subsystem 111 may include, for example, data processing equipment, communication equipment, and/or other systems that control injection treatments applied to the subsurface formation 104 through the wellbore 102. In one or more embodiments, the injection control subsystem 111 may receive, generate, or modify a baseline treatment plan for implementing the various stages of the stimulation treatment along the path of the wellbore 102. The baseline treatment plan may specify initial parameters for the treatment fluid, including proppant, to be injected into the subsurface formation 104. The treatment plan may also specify a baseline pumping schedule for the treatment fluid injections and diverter deployments over each stage of the stimulation treatment.

In one or more embodiments, the injection control subsystem 111 initiates control signals to configure the injection tools 116 and/or other equipment (e.g., pump trucks, etc.) for operation based on the treatment plan. The signaling subsystem 114 as shown in FIG. 1 transmits the signals from the injection control subsystem 111 at the wellbore surface 110 to one or more of the injection tools 116 disposed in the wellbore 102. For example, the signaling subsystem 114 may transmit hydraulic control signals, electrical control signals, and/or other types of control signals. The control signals may be formatted as needed or desired for transmission between the injection control subsystem 111 (and/or another source) and the injection tools 116 (and/or another destination). The signals transmitted to the injection tools 116 may control the configuration and/or operation of the injection tools 116. Examples of different ways to control the operation of each of the injection tools 116 include, but are not limited to, opening, closing, restricting, dilating, repositioning, reorienting, and/or otherwise manipulating one or more valves of the tool to modify the manner in which treatment fluid, including fracturing fluid and proppant, is communicated into the subsurface formation 104. It should be appreciated that the combination of injection valves of the injection tools 116 may be configured or reconfigured at any given time during the stimulation treatment.

In some implementations, the signaling subsystem 114 transmits a control signal to multiple injection tools, and the control signal is formatted to change the state of only one or a subset of the multiple injection tools. For example, a shared electrical or hydraulic control line may transmit a control signal to multiple injection valves, and the control signal may be formatted to selectively change the state of only one (or a subset) of the injection valves. In some cases, the pressure, amplitude, frequency, duration, and/or other properties of the control signal determine which injection tool is modified by the control signal. In some cases, the pressure, amplitude, frequency, duration, and/or other properties of the control signal determine the state of the injection tool affected by the modification.

In one or more embodiments, the injection tools 116 may include various sensors for collecting data relating to downhole operating conditions and formation properties along the wellbore 102. Such sensors may serve as real-time data sources at the wellsite for various types of downhole measurements and diagnostic information pertaining to each stage of the stimulation treatment. Examples of such sensors include, but are not limited to, micro-seismic sensors, tiltmeters, pressure sensors, and other types of downhole sensing equipment. The data collected downhole by such sensors may include, for example, real-time measurements and diagnostic data for monitoring the extent of fracture growth and complexity within the surrounding formation at each stage of the stimulation treatment the wellbore 102.

Figure 2:
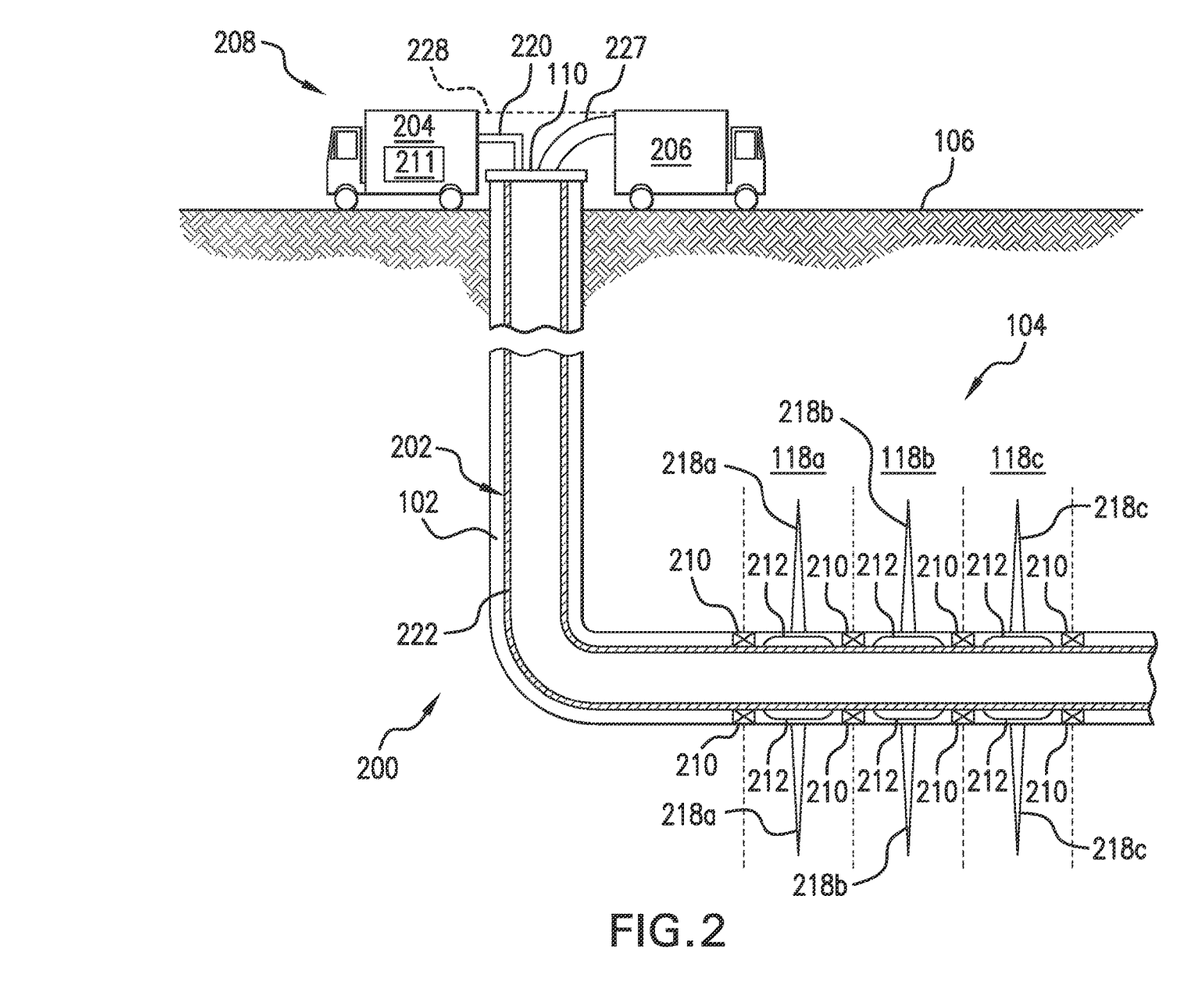
FIG. 2 is a diagram of an illustrative wellbore system with equipment for injecting treatment fluid into the reservoir formation via injection points or perforations corresponding to different stages of the multistage stimulation treatment along the wellbore of FIG. 1.

FIG. 2 is a diagram of a wellbore system 200 with equipment for injecting treatment fluid into the reservoir formation via injection points or perforations corresponding to the different stages of the multistage stimulation treatment along the wellbore 102 of FIG. 1, as described above. As shown in FIG. 2, the wellbore system 200 may include an injection system 208 that injects the treatment fluid into the subterranean region 104 from the wellbore 102. The injection system 208 in this example includes instrument trucks 204, pump trucks 206, an injection control subsystem 211, conduits 202 and 227, control lines 220 and 222, packers 210, and injection tools 212. It should be appreciated that the injection system 208 may include other subsystems, components and features that are not shown in FIG. 2.

In one or more embodiments, the injection system 208 may inject fluid into the formation 104 above, at, or below a fracture initiation pressure for the formation, a fracture closure pressure for the formation, and/or at another fluid pressure. Fracture initiation pressure may refer to a minimum fluid injection pressure that can initiate and/or propagate fractures in the subterranean formation. Fracture closure pressure may refer to a minimum fluid injection pressure that can dilate existing fractures in the subterranean formation.

The instrument trucks 204 may include mobile vehicles, immobile installations, and/or other suitable structures. The instrument trucks 204 include an injection control subsystem 211 that controls and/or monitors injection treatments applied by the injection system 208. The injection control subsystem 211 may include the features of the injection control subsystem 111 described with respect to FIG. 1. The communication links 228 may allow the instrument trucks 204 to communicate with the pump trucks 206, and/or other equipment at the surface 106. The communication links 228 may allow the instrument trucks 204 to communicate with sensors and/or data collection apparatus in the well system 200 (not shown). The communication links 228 may allow the instrument trucks 204 to communicate with remote systems, other well systems, equipment installed in the wellbore 102 and/or other devices and equipment. The communication links 228 can include multiple uncoupled communication links and/or a network of coupled communication links. The communication links 228 may include wired and/or wireless communications systems.

The control lines 220, 222 allow the instrument trucks 204 and/or other subsystems to control the state of the injection tools 212 installed in the wellbore 102. In the example shown, the control lines 220 transmit control signals from the instrument trucks 204 to the wellbore surface 110, and the control lines 222 installed in a conduit 202 of the wellbore 102 transmit the control signals from the wellbore surface 110 to the injection tools 212 downhole. For example, the control lines 222 may be implemented using the signaling subsystem 114 of FIG. 1, as described above.

The injection system 208 may also include surface and down-hole sensors (not shown) to measure pressure, rate, temperature and/or other parameters of treatment and/or production. The injection system 208 may include pump controls and/or other types of controls for starting, stopping and/or otherwise controlling pumping as well as controls for selecting and/or otherwise controlling fluids pumped during the injection treatment. The injection control system 211 may communicate with such equipment to monitor and control the injection treatment.

The pump trucks 206 may include mobile vehicles, immobile installations, skids, hoses, tubes, fluid tanks, fluid reservoirs, pumps, valves, mixers, and/or other suitable structures and equipment. The pump trucks 206 supply treatment fluid and/or other materials for the injection treatment. The pump trucks 206 may contain multiple different treatment fluids, proppant materials, and/or other materials for different stages of a stimulation treatment.

The pump trucks 206 communicate treatment fluids into the wellbore 102 at the wellbore surface 110. The treatment fluids are communicated through the wellbore 102 from the wellbore surface 110 by the conduit 202 installed in the wellbore 102. The conduit 202 may include casing cemented to the wall of the wellbore 102. In some implementations, all or a portion of the wellbore 102 may be left open, without casing. The conduit 202 may include a working string, coiled tubing, sectioned pipe, and/or other types of conduit. The conduit 202 is coupled to the injection tools 212. The injection tools 212 may include valves, sliding sleeves, ports, and/or other features that communicate fluid from the conduit 202 into the formation 104. The injection tools 212 may include the features of the injection tools 116 described with respect to FIG. 1. The packers 210 may be used to isolate the areas of the formation 104 that receive the injected materials from the injection tools 212 over different stages or intervals 118 of the stimulation treatment along the wellbore 102. The packers 210 may include mechanical packers, fluid inflatable packers, sand packers, fluid sensitive or fluid activated swelling packers, and/or other types of packers. While only three intervals 118*a*, 118*b*, and 118*c* are shown in FIG. 2, it should be appreciated that the disclosed techniques may apply to any number of intervals.

In one or more embodiments, each of the injection tools 212 may be positioned, oriented, and/or otherwise configured in the wellbore 102 to control, for example, the location, rate, angle, and/or other characteristics of fluid flow into an adjacent interval 118 for an area of the formation 104. The injection tools 212 may be coupled to the control lines 222 to receive control signals transmitted from the wellbore surface 110. For example, each of the injection tools 212 may be opened, closed, and/or otherwise reconfigured multiple times. The control signals may include pressure amplitude control signals, frequency modulated electrical control signals, digital electrical control signals, amplitude modulated electrical control signals, and/or other types of control signals transmitted by the control lines 222.

Figure 3:
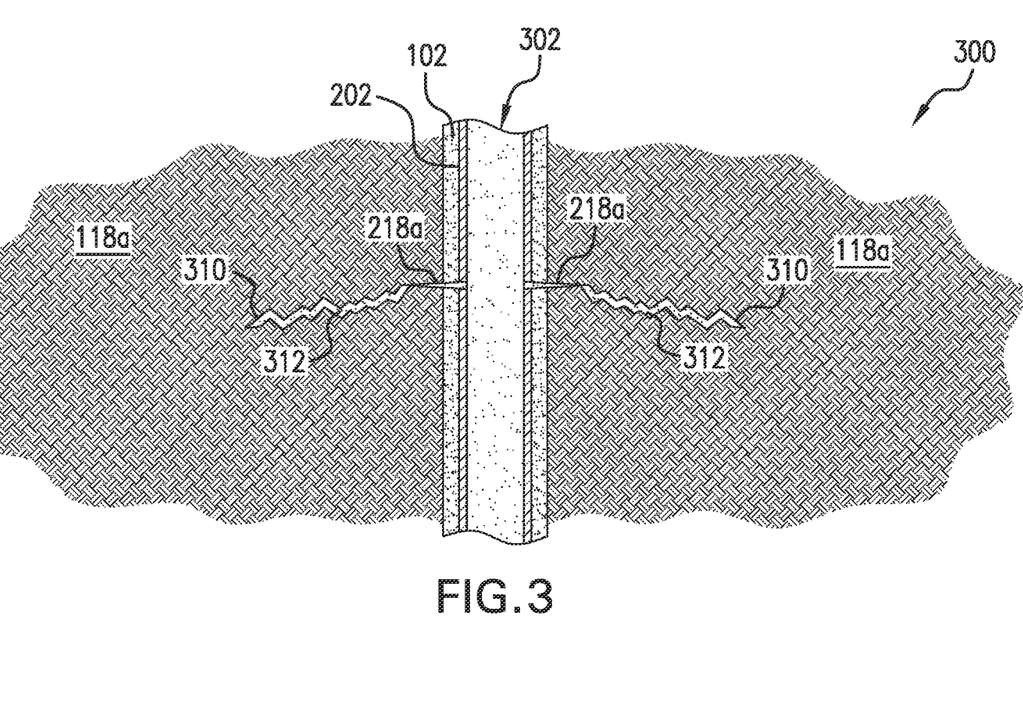
FIG. 3 is a diagram illustrating an example of a fractured area of the reservoir formation corresponding to a stage of the multistage stimulation treatment performed along the wellbore of FIGS. 1 and 2.

FIG. 3 is a diagram illustrating an example of a fractured area 300 of a subsurface reservoir formation, e.g., corresponding to a stage of the multistage stimulation treatment performed along the wellbore 102 of FIGS. 1 and 2, as described above. The fractured area 300 may correspond to, for example, a fractured area of the formation 104 corresponding to the interval 118*a* along the wellbore 102 of FIGS. 1 and 2. As shown in FIG. 3, the injection of treatment fluid 302 via the conduit 202 and the perforation 218*a* along the wellbore 102 may create a fracture 310 within the formation into which particles of proppant 312 may flow.

Figure 4:
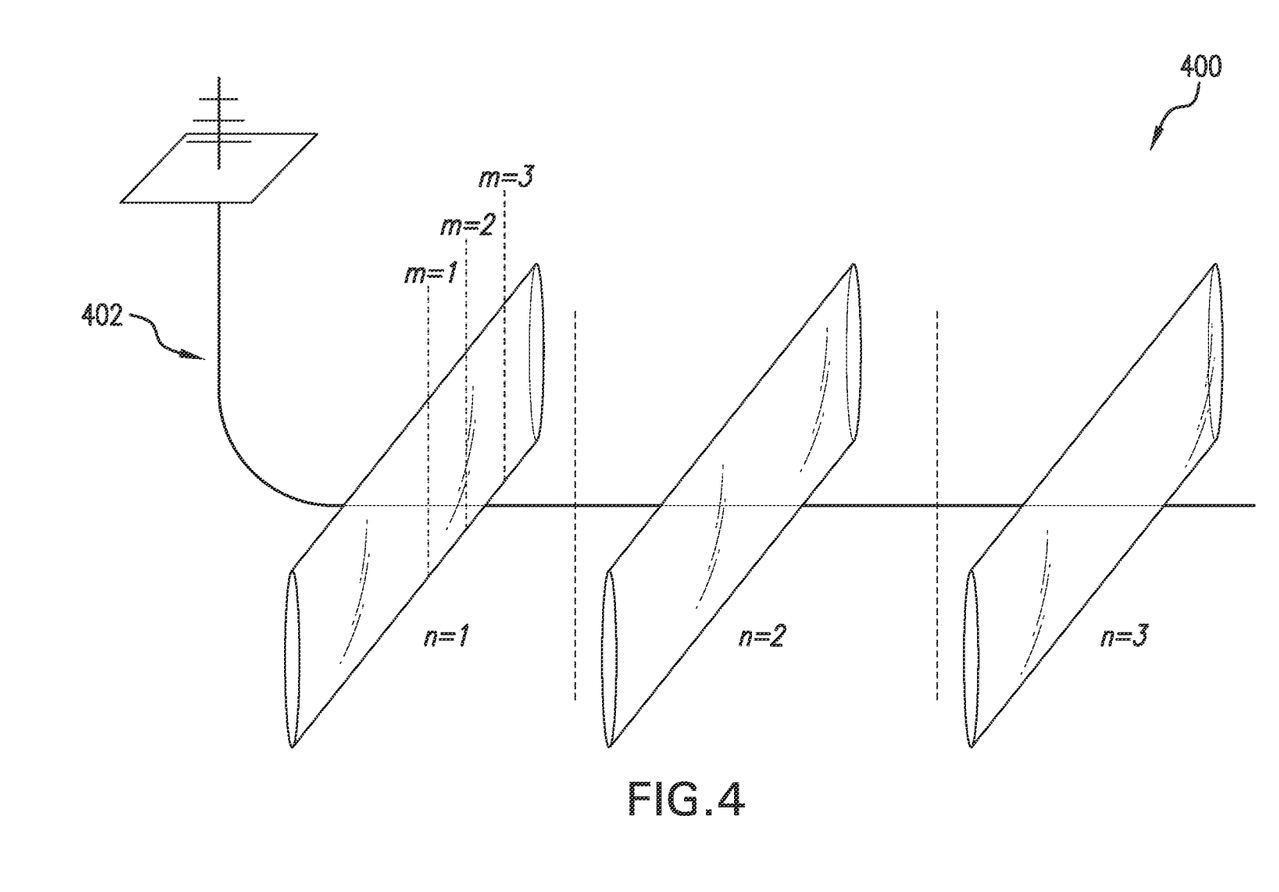
FIG. 4 is a diagram of multiple fractured areas of a reservoir formation corresponding to different stages of a multistage stimulation treatment along a wellbore.

Proppant placement within the wellbore 102 at each stage of the stimulation treatment may affect the respective flow path resistance within the individual fractures. The amount of proppant that is placed into the wellbore may be constrained by any number of factors, including those that may be external to the stimulation treatment itself. Such external factors may include, for example, one or more user specified preferences or restrictions on the type and/or cost of proppant to be used for the stimulation treatment as well as the availability of a particular proppant. Due to such factors, the proppant may need to be optimally distributed to multiple fractured areas of the formation as different stages of the stimulation treatment are performed along the wellbore, e.g., as shown in FIG. 4, which will be described in further detail below.

In one or more embodiments, a combination of different models may be used to determine an optimal distribution of proppant along the wellbore so as to achieve an overall objective of the stimulation treatment, for example, improving hydrocarbon production, including production that is prioritized on a desired time basis, e.g., to favor Initial Production (IP) in the short-term versus Estimated Ultimate Recovery (EUR) over the long-term. Such models may include, but are not limited to, a proppant transport model, a proppant conductivity model, and a well production model.

In one or more embodiments, the proppant transport model may be used to determine a proppant profile for each stage of the multistage fracturing treatment along the wellbore. Such a model may be a physical model, an empirical model, or a combination thereof. The proppant profile may reflect a distribution of profile inside the fracture or fracture network based on properties of the fracturing fluid and proppant injected into the reservoir formation as well as properties of the formation and reservoir fluids included therein. The properties of the reservoir formation and fluids may be determined based on data obtained from various sources including, but not limited to, measurements from logging-while-drilling (LWD) or measurement-while-drilling (MWD) tools within the same or nearby well, lab data, and/or formation data published in industry manuals, academic literature or similar data sources. Such properties may include, but are not limited to, porosity, permeability, elasticity, toughness, viscosity and any other property relating to the characteristics of the formation and/or reservoir fluids. The properties of the treatment fluid may be determined based on a treatment plan for the multistage fracturing treatment.

In one or more embodiments, the proppant conductivity model may use the proppant profile determined for each stage of the multistage stimulation treatment along the wellbore to determine a proppant pack conductivity for that treatment stage. The proppant pack conductivity may be a value representing the distribution of proppant inside a fracture or fractured area of the reservoir formation for a corresponding stage of the stimulation treatment. The proppant conductivity model may correlate the proppant pack conductivity for each treatment stage to flow characteristics of the corresponding formation area and proppant to be injected into the formation area at that treatment stage. This may include correlating the proppant distribution as well as other proppant properties, e.g., physical characteristics (size, strength, shape, etc.), proppant injection/pumping schedule and pumping modes, to their net effect on fluid flow inside the fracture or fractured formation area as a function of location in a larger fracture network within the formation. Certain properties of the proppant may be derived from a well-known or proprietary materials library or database, e.g., which may provide a baseline conductivity for various types of proppant materials under Darcy flow conditions. However, it should be appreciated that additional laboratory testing or research may be used to supplement or enhance this model, e.g., for regimes where less than a full monolayer of proppant is needed.

In one or more embodiments, the proppant pack conductivity determined for each stage of the multistage stimulation treatment may be applied as input to a well production model to estimate a rate of hydrocarbon production expected from the wellbore. In some implementations, the well production model may be a one-dimensional (1D) model, which is optimized for fast execution. Such a fast execution model may incorporate various components for correlating production to individual parameters of the formation (or fractured areas thereof), as will be described in further detail below.

FIG. 4 is a diagram illustrating an example of multiple ("n") fractured areas of a reservoir formation 400 along a lateral section of a wellbore 402, where n may be any integer value. While only three ("n=3") fractured areas are shown in FIG. 4, it should be appreciated that formation 400 may include any number of fractured areas and that the number of fractured areas may be optimized based on, for example, the particular reservoir formation or other parameters of a particular stimulation treatment plan. The fractured areas in this example may correspond to different stages of a multistage stimulation treatment along the wellbore 402. Each of the fractured areas may be subdivided into "n" individual segments, as shown for the first (n=1) fractured area in FIG. 4. The reservoir fluid flow through a segment m of each fracture n may be expressed by Equation (1) as follows:

$$\frac{K_{n,m}A_{n,m}(P^t_{n,m+1} - P^t_{n,m})}{\mu L_{n,m}} = \frac{q^t_{n,m}}{2} + \sum_{i=(m+1)}^{M_n} q^t_{n,i} \quad (1)$$

where K is the permeability or conductivity of a segment in of a fracture n (or "fracture segment n,m"); A is the surface area of the fracture segment; $P_{n,m}{}^t$ is the pressure the beginning of the fracture segment; $P_{n,m+1}{}^t$ is the pressure the end of the fracture segment; μ is the viscosity of the fluid; $q_{n,m}{}^t$ is the flow rate generated by the fracture segment; and $L_{n,m}$ is the length of the fracture segment.

The flow rate ($q_{n,m}{}^t$) for a fracture segment n,m may be determined based on pore pressure ($Pr_{n,m}{}^t$), e.g., according to the set of Equations (2)-(6):

$$q^t_{n,m} = T_{mf} * \left( Pr^t_{n,m} - \frac{P^t_{n,m} + P^t_{n,m+1}}{2} \right) \quad (2)$$

$$T_{mf} = \frac{T_m * T_f}{T_m + T_f} \quad (3)$$

$$T_m = K_m * V_m * \sigma \quad (4)$$

$$T_f = 2K_f \frac{L_{n,m} h_f}{w_f} \quad (5)$$

$$\sigma = \frac{4}{L_x^2 + L_y^2 + L_z^2} \quad (6)$$

where $T_{mf}$ is the matrix-fracture transmissibility multiplier; $T_m$ and $T_f$ are half-cell transmissibilities for the matrix and fracture segment, respectively; $V_m$ is the matrix cell bulk volume; a is the shape factor for the fracture segment; $L_x^2$, $L_y^2$, $L_z^2$ are averaged spacings or distances between neighboring fracture segments in the x, y and z planes of a three-dimensional (3D) space; and $K_m$, $K_f$ are permeability values for the matrix and the fracture segment, respectively. It should be appreciated that values for some of these parameters, e.g., the spacing/distance between fracture segments, may be measured downhole (e.g., using LWD/MWD tools disposed within wellbore 402) while the values for other parameters may be calculated (e.g., using a flow model representing the flow behavior of fluids within fractured media).

In one or more embodiments, the evolution of the pore pressure ($Pr_{n,m}^{t+1}$), may be calculated using Equation (7):

$$Pr_{n,m}^{t+1} = Pr_{n,m}^{t} - \frac{q_{n,m}^{t} * \Delta t}{\emptyset_m C_m V_m} \quad (7)$$

where $\emptyset_m$ is porosity for the matrix; and $C_m$ is compressibility for the matrix The initial value of the pore pressure may be expressed by Equation (8):

$$Pr_{n,m}^{0} = Pr_0 \quad (8)$$

The total flow rate in the fracture Q may be expressed by Equation (9);

$$Q_n^t = \Sigma_{i=1}^{M_n} q_{n,i}^t \quad (9)$$

Further, a wellbore friction model or parameters thereof may be incorporated into the pore pressure calculation, e.g., as expressed by Equation (10):

$$P_{n+1,1}^{t} = P_{n,1}^{t} + \alpha G_n \Sigma_{i=(n+1)}^{N} Q_i^t \quad (10)$$

where $\alpha$ is the wellbore friction coefficient per unit length and G is the length of the wellbore between the fractures or fractured areas of the formation.

A controlled boundary condition, e.g., bottom hole pressure as expressed by Equation (11), may also be used in the pore pressure calculations:

$$P_{1,1}^{t} = P_{BH} \quad (11)$$

where $P_{BH}$ in this example is the bottom hole pressure at the entrance to fracture segment 1,1 (i.e., the first segment (m=1) of the first fracture (n=1)) at the heel of wellbore 402. The value of this parameter may be derived based on, for example, typical draw down pressure profiles of one or more nearby wells.

In one or more embodiments, a well production model incorporating Equations (1)-(11) may be used to calculate the sensitivity of a particular output (e.g., hydrocarbon production) to any input or set of inputs. For example, the well production model may be used to estimate a rate of hydrocarbon production expected from the wellbore for a given set of input parameters associated with the proppant to be injected into the formation over different stages of a stimulation treatment along the wellbore. As described above, such a well production model may be a 1D or reduced-order model that is optimized for speed of execution, e.g., as part of a well planning and control application executable at a computer system. An example of such a computer system will be described in further detail below with respect to FIG. 6. Accordingly, the well production model may be used to quickly estimate values of the input(s), e.g., proppant parameters, to produce a desired output, e.g., improved hydrocarbon production, subject to any operational constraints or preferences. For example, if the constraint is a limit on the total amount of proppant that can be used for the stimulation treatment, the well production model may be used to determine an optimal distribution or spread of the proppant across the different fractured areas and corresponding stages of the treatment along the wellbore. It should be appreciated that any of various well-known constraint-based optimization techniques may be used with the well production model for this purpose. Examples of such techniques include, but are not limited to, nonlinear least squares (NNLS) regression analysis and sequential least squares quadratic programming (SLSQP).

In one or more embodiments, these techniques may be used with the well production model as part of an optimization process for estimating a rate of change in the wellbore's production relative to the individual proppant parameters and any operational constraints associated with the multistage stimulation treatment and then, using this estimate to determine an optimal distribution of proppant to be injected into the reservoir formation over the course of the treatment. An example of such a process will be described in further detail below with respect to FIG. 5.

Figure 5:
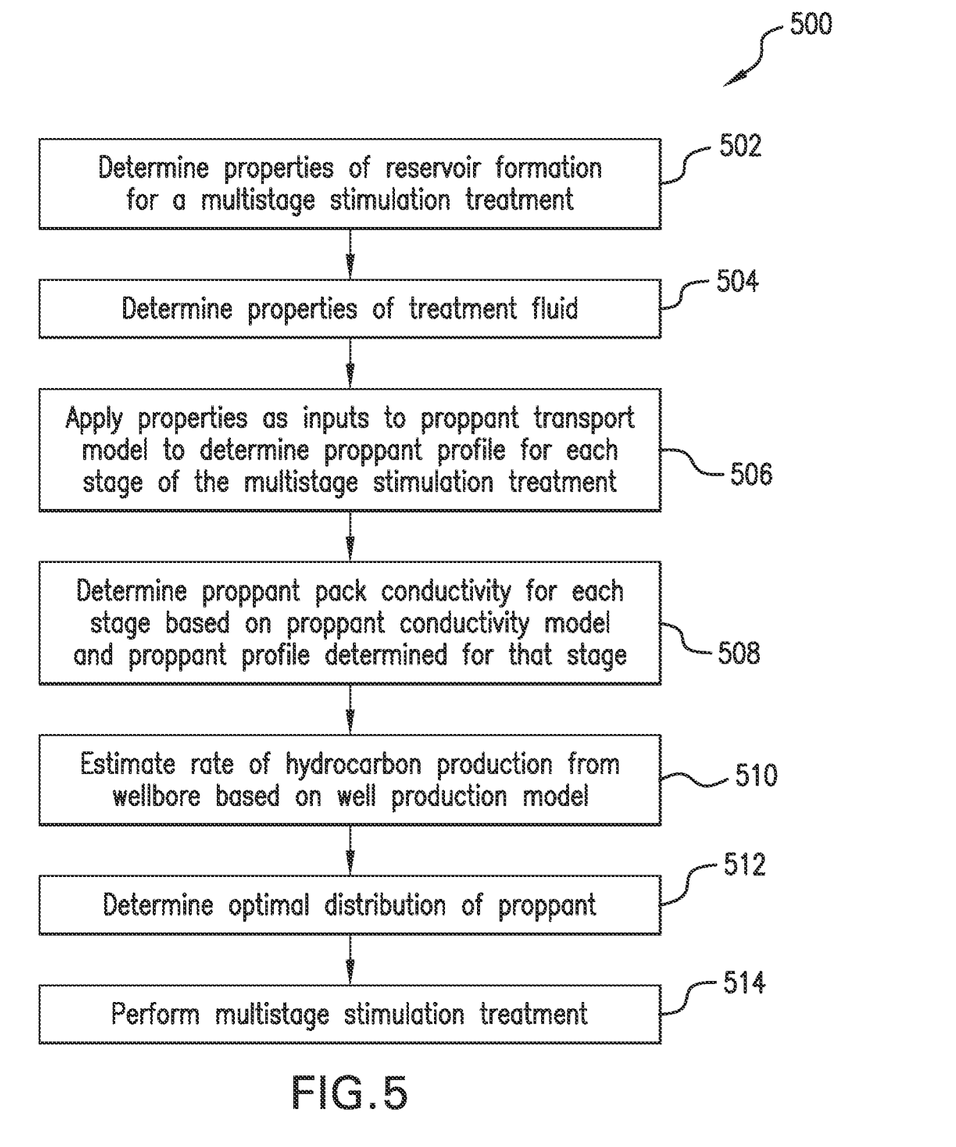
FIG. 5 is a flowchart of an illustrative process for optimizing proppant placement for multistage stimulation treatments along a wellbore within a reservoir formation.

FIG. 5 is a flowchart of an illustrative process 500 for optimizing proppant placement for multistage stimulation treatments along a wellbore within a reservoir formation. For purposes of discussion, process 500 will be described using wellbore systems 100 and 200 of FIGS. 1 and 2, respectively, as described above. However, process 500 is not intended to be limited thereto.

As shown in the example of FIG. 5, process 500 may begin in block 502, which includes determining properties of a reservoir formation for a multistage stimulation treatment to be performed along a wellbore (or lateral portion thereof) drilled within a reservoir formation, e.g., wellbore 102 within formation 104 of FIGS. 1 and 2 or wellbore 402 within formation 400 of FIG. 4, as described above. The properties of the reservoir formation may be determined based on measurements collected by one or more downhole tools disposed within the wellbore.

Process 500 then proceeds to block 504, which includes determining properties of a treatment fluid to be injected into the reservoir formation during each stage of the multistage stimulation treatment along the wellbore. As described above, the treatment fluid may include a fracturing fluid and a proppant, e.g., suspended proppant particles the fracturing fluid. However, it should be appreciated that any type of carrier fluid may be used for carrying the proppant downhole and into the formation during the fluid injection phases of the stimulation treatment to be performed along the wellbore. In one or more embodiments, the properties in block 504 may be determined based on a treatment plan for the multistage stimulation treatment. Such properties may include, for example and without limitation, one or more of a treatment fluid volume, a proppant type, a proppant mass, a proppant size, a proppant shape, a proppant distribution, and a proppant injection rate. The proppant distribution may include the properties of a proppant mixture that combines two or more proppant types and/or physical properties thereof, e.g., a combination or blend of proppant particles having different sizes and/or shapes.

In block 506, the respective properties of the reservoir formation and the treatment fluid may be applied as inputs to a proppant transport model to determine a proppant profile for each stage of the multistage stimulation treatment along the wellbore. As described above, each stage of the treatment may correspond to, for example, a different area of the formation that has or will be fractured along a corresponding interval or section of the wellbore. In one or more embodiments, the proppant profile may include an amount and a placement of the proppant within the corresponding fracture for each stage of the multistage stimulation treatment along the wellbore.

In block 508, a proppant pack conductivity may be determined for each stage of the multistage stimulation treatment, based on a proppant conductivity model and the proppant profile determined for that stage in block 506. The proppant conductivity model may correlate the proppant pack conductivity to flow characteristics of the reservoir formation and proppant to be injected at each stage of the multistage stimulation treatment along the wellbore.

In block 510, the proppant pack conductivity determined in block 508 for each treatment stage may be used in conjunction with a well production model, e.g., as expressed by Equations (1)-(11) described above, to estimate a rate of hydrocarbon production expected from the wellbore. The well production model may correlate the rate of hydrocarbon production with treatment parameters associated with the fractured area of the reservoir formation corresponding to each stage of the multistage stimulation treatment along the wellbore. The treatment parameters may include, but are not limited to, wellbore characteristics, fracture characteristics, reservoir fluid properties, a production schedule, and a choke schedule.

Process 500 may then proceed to block 512, which includes determining an optimal distribution of proppant to be injected into the reservoir formation during the multistage stimulation treatment along the wellbore, based on the estimated rate of hydrocarbon production and one or more constraints specified by the treatment plan for the multistage stimulation treatment. Such constraints may include, for example and without limitation, a duration of the multistage stimulation treatment, one or more proppant types, a proppant mass, a range of proppant injection rates for each stage, a minimum proppant amount per stage, and a maximum proppant amount per stage. The optimal proppant distribution determined in block 512 may be used to maximize or at least improve hydrocarbon production from the wellbore within the specified constraints.

In block 514, the multistage stimulation treatment may be performed according to the treatment plan and the optimal proppant distribution determined in block 512.

Figure 6:
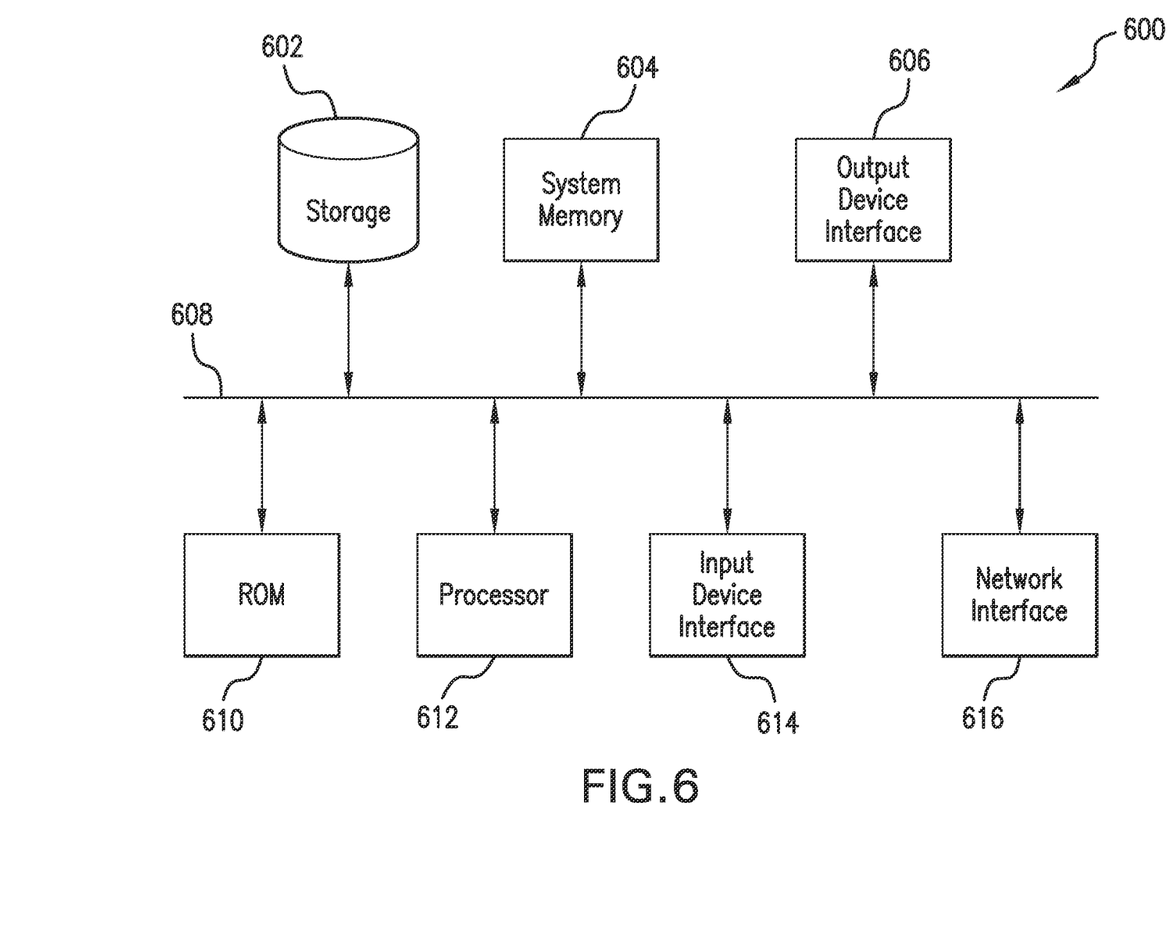
FIG. 6 is a block diagram of an illustrative computer system in which embodiments of the present disclosure may be implemented.

FIG. 6 is a block diagram of an exemplary computer system 600 in which embodiments of the present disclosure may be implemented. For example, the injection control subsystems 111 and 211 (or respective data processing components thereof) of FIGS. 1 and 2, respectively, and process 500 of FIG. 5, as described above, may be implemented using system 600. System 600 can be a desktop or mobile computer (e.g., a laptop, tablet or smartphone device), workstation, server or cluster of servers, or any other type of electronic device. Such an electronic device includes various types of computer readable media and interfaces for various other types of computer readable media. As shown in FIG. 6, system 600 includes a permanent storage device 602, a system memory 604, an output device interface 606, a system communications bus 608, a read-only memory (ROM) 610, processing unit(s) 612, an input device interface 614, and a network interface 616.

Bus 608 collectively represents all system, peripheral, and chipset buses that communicatively connect the numerous internal devices of system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of system 600. Permanent storage device 602, on the other hand, is a read-and-write memory device. This device is a non-volatile memory unit that stores instructions and data even when system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for performing the proppant placement optimization techniques disclosed herein. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the system 600. Input devices used with input device interface 614 include, for example, alphanumeric, QWERTY, or T9 keyboards, microphones, and pointing devices (also called "cursor control devices"). Output device interfaces 606 enables, for example, the display of images generated by the system 600. Output devices used with output device interface 606 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 6, bus 608 also couples system 600 to a public or private network (not shown) or combination of networks through a network interface 616. Such a network may include, for example, a local area network ("LAN"), such as an Intranet, or a wide area network ("WAN"), such as the Internet. Any or all components of system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, process 500 of FIG. 5, as described above, may be implemented using system 600 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for optimizing proppant placement for hydraulic fracturing operations, including multistage stimulation treatments for stimulating hydrocarbon production from a wellbore drilled within a reservoir formation. Accordingly, advantages of the present disclosure include improving or maximizing wellbore productivity within a given set of operating constraints. For example, a well production model may be used with constraint-based optimization techniques, as described above, to provide optimal values for controllable variables of a multistage stimulation treatment in order to maximize productivity with the given constraints, e.g., with respect to proppant selection, loading and/or other parameters, for performing the stimulation treatment. This may also provide a well operator with options based on a cost versus benefit analysis for adjusting the constraints on the treatment plan, type of proppant, proppant schedule, etc. associated with the treatment to achieve a desired level of productivity, which may be greater than the maximum level that is achievable with current set of constraints and increase costs by only a small margin.

In one or more embodiments of the present disclosure, a computer-implemented method of optimizing proppant placement for stimulation treatments includes: determining properties of a reservoir formation for a multistage stimulation treatment to be performed along a wellbore drilled within a reservoir formation; determining properties of a treatment fluid to be injected into the reservoir formation during each stage of the multistage stimulation treatment along the wellbore, based on a treatment plan for the multistage stimulation treatment, the treatment fluid including a fracturing fluid and a proppant, applying the respective properties of the reservoir formation and the treatment fluid as inputs to a proppant transport model to determine a proppant profile for a fractured area of the reservoir formation corresponding to each stage of the multistage stimulation treatment along the wellbore; determining a proppant pack conductivity for each stage of the multistage stimulation treatment, based on a proppant conductivity model and the proppant profile determined for that stage; estimating a rate of hydrocarbon production expected from the wellbore, based on a well production model and the proppant pack conductivity determined for each stage of the multistage stimulation treatment; determining a distribution of proppant to be injected into the reservoir formation during the multistage stimulation treatment along the wellbore, based on the estimated rate of hydrocarbon production and one or more constraints specified by the treatment plan for the multistage stimulation treatment; and performing the multistage stimulation treatment according to the treatment plan and the determined distribution of the proppant.

Further, a non-transitory computer-readable storage medium with instructions stored therein is described above, where the instructions when executed by a computer cause the computer to perform a plurality of functions, including functions to: determine properties of a reservoir formation for a multistage stimulation treatment to be performed along a wellbore drilled within a reservoir formation determine properties of a treatment fluid to be injected into the reservoir formation during each stage of the multistage stimulation treatment along the wellbore, based on a treatment plan for the multistage stimulation treatment, the treatment fluid including a fracturing fluid and a proppant; apply the respective properties of the reservoir formation and the treatment fluid as inputs to a proppant transport model to determine a proppant profile for a fractured area of the reservoir formation corresponding to each stage of the multistage stimulation treatment along the wellbore; determine a proppant pack conductivity for each stage of the multistage stimulation treatment, based on a proppant conductivity model and the proppant profile determined for that stage; estimate a rate of hydrocarbon production expected from the wellbore, based on a well production model and the proppant pack conductivity determined for each stage of the multistage stimulation treatment; determine a distribution of proppant to be injected into the reservoir formation during the multistage stimulation treatment along the wellbore, based on the estimated rate of hydrocarbon production and one or more constraints specified by the treatment plan for the multistage stimulation treatment; and control injection of proppant along the wellbore as each stage of the multistage stimulation treatment is performed according to the treatment plan and the determined distribution of the proppant.

For any of the foregoing embodiments, the method or functions performed by the computer may include any of the following steps, functions or elements, either individually or in any combination: the properties of the reservoir formation may be determined based on measurements collected by one or more downhole tools disposed within the wellbore; the properties of the treatment fluid are selected from the group consisting of a treatment fluid volume, a proppant type, a proppant mass, a proppant size, a proppant shape, a proppant distribution, and a proppant injection rate; the one or more constraints are selected from the group consisting of a duration of the multistage stimulation treatment, one or more proppant types, a maximum proppant mass, a maximum proppant mass, a range of proppant injection rates for each stage, a minimum proppant amount per stage, and a maximum proppant amount per stage; each stage of the multistage stimulation treatment corresponds to a fracture to be produced in an area of the reservoir formation surrounding a portion of the wellbore corresponding to that stage of multistage stimulation treatment, the proppant profile includes an amount and a placement of the proppant within the corresponding fracture for each stage of the multistage stimulation treatment along the wellbore; the proppant conductivity model correlates the proppant pack conductivity to flow characteristics of the reservoir formation and proppant to be injected at each stage of the multistage stimulation treatment along the wellbore; the well production model correlates the rate of hydrocarbon production with treatment parameters associated with the fractured area of the reservoir formation corresponding to each stage of the multistage stimulation treatment along the wellbore; the treatment parameters are selected from the group consisting of wellbore characteristics, fracture characteristics, reservoir fluid properties, a production schedule, and a choke schedule.

Likewise, a system is described, which includes at least one processor and a memory coupled to the at least one processor having instructions stored therein, which when executed by the at least one processor, cause the at least one processor to perform a plurality of functions, including functions to: determine properties of a reservoir formation for a multistage stimulation treatment to be performed along a wellbore drilled within a reservoir formation; determine properties of a treatment fluid to be injected into the reservoir formation during each stage of the multistage stimulation treatment along the wellbore, based on a treatment plan for the multistage stimulation treatment, the treatment fluid including a fracturing fluid and a proppant; apply the respective properties of the reservoir formation and the treatment fluid as inputs to a proppant transport model to determine a proppant profile for a fractured area of the reservoir formation corresponding to each stage of the multistage stimulation treatment along the wellbore; determine a proppant pack conductivity for each stage of the multistage stimulation treatment, based on a proppant conductivity model and the proppant profile determined for that stage; estimate a rate of hydrocarbon production expected from the wellbore, based on a well production model and the proppant pack conductivity determined for each stage of the multistage stimulation treatment; determine a distribution of proppant to be injected into the reservoir formation during the multistage stimulation treatment along the wellbore, based on the estimated rate of hydrocarbon production and one or more constraints specified by the treatment plan for the multistage stimulation treatment; and control injection of proppant along the wellbore as each stage of the multistage stimulation treatment is performed according to the treatment plan and the determined distribution of the proppant.

In one or more embodiments, the system may include any of the following functions or elements, either individually or in any combination: the properties of the reservoir formation may be determined based on measurements collected by one or more downhole tools disposed within the wellbore; the properties of the treatment fluid are selected from the group consisting of a treatment fluid volume, a proppant type, a proppant mass, a proppant size, a proppant shape, a proppant distribution, and a proppant injection rate; the one or more constraints are selected from the group consisting of a duration of the multistage stimulation treatment, one or more proppant types, a maximum proppant mass, a maximum proppant mass, a range of proppant injection rates for each stage, a minimum proppant amount per stage, and a maximum proppant amount per stage; each stage of the multistage stimulation treatment corresponds to a fracture to be produced in an area of the reservoir formation surrounding a portion of the wellbore corresponding to that stage of multistage stimulation treatment, the proppant profile includes an amount and a placement of the proppant within the corresponding fracture for each stage of the multistage stimulation treatment along the wellbore; the proppant conductivity model correlates the proppant pack conductivity to flow characteristics of the reservoir formation and proppant to be injected at each stage of the multistage stimulation treatment along the wellbore; the well production model correlates the rate of hydrocarbon production with treatment parameters associated with the fractured area of the reservoir formation corresponding to each stage of the multistage stimulation treatment along the wellbore; the treatment parameters are selected from the group consisting of wellbore characteristics, fracture characteristics, reservoir fluid properties, a production schedule, and a choke schedule.

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of optimizing proppant placement for stimulation treatments, the method comprising:

determining properties of a reservoir formation for a multistage stimulation treatment to be performed along a wellbore drilled within a reservoir formation;

determining properties of a treatment fluid to be injected into the reservoir formation during each stage of the multistage stimulation treatment along the wellbore, based on a treatment plan for the multistage stimulation treatment, the treatment fluid including a fracturing fluid and a proppant;

applying the respective properties of the reservoir formation and the treatment fluid as inputs to a proppant transport model to determine a proppant profile for a fractured area of the reservoir formation corresponding to each stage of the multistage stimulation treatment along the wellbore;

determining a proppant pack conductivity for each stage of the multistage stimulation treatment, based on a proppant conductivity model and the proppant profile determined for that stage;

estimating a rate of hydrocarbon production expected from the wellbore, based on a well production model and the proppant pack conductivity determined for each stage of the multistage stimulation treatment;

determining a distribution of proppant to be injected into the reservoir formation during the multistage stimulation treatment along the wellbore, based on the estimated rate of hydrocarbon production and one or more constraints specified by the treatment plan for the multistage stimulation treatment; and performing the multistage stimulation treatment according to the treatment plan and the determined distribution of the proppant.

2. The method of claim 1, wherein the properties of the reservoir formation are determined based on measurements collected by one or more downhole tools disposed within the wellbore.

3. The method of claim 1, wherein the properties of the treatment fluid are selected from the group consisting of: a treatment fluid volume; a proppant type; a proppant mass; a proppant size; a proppant shape; a proppant distribution; and a proppant injection rate.

4. The method of claim 1, wherein the one or more constraints are selected from the group consisting of: a duration of the multistage stimulation treatment; one or more proppant types; a maximum proppant mass; a maximum proppant mass; a range of proppant injection rates for each stage; a minimum proppant amount per stage; and a maximum proppant amount per stage.

5. The method of claim 1, wherein each stage of the multistage stimulation treatment corresponds to a fracture to be produced in an area of the reservoir formation surrounding a portion of the wellbore corresponding to that stage of multistage stimulation treatment.

6. The method of claim 5, wherein the proppant profile includes an amount and a placement of the proppant within the corresponding fracture for each stage of the multistage stimulation treatment along the wellbore.

7. The method of claim 5, wherein the proppant conductivity model correlates the proppant pack conductivity to flow characteristics of the reservoir formation and proppant to be injected at each stage of the multistage stimulation treatment along the wellbore.

8. The method of claim 5, wherein the well production model correlates the rate of hydrocarbon production with treatment parameters associated with the fractured area of the reservoir formation corresponding to each stage of the multistage stimulation treatment along the wellbore.

9. The method of claim 8, wherein the treatment parameters are selected from the group consisting of: wellbore characteristics; fracture characteristics; reservoir fluid properties; a production schedule; and a choke schedule.

10. A system comprising:
at least one processor; and
a memory coupled to the at least one processor having instructions stored therein, which when executed by the at least one processor, cause the at least one processor to perform a plurality of functions, including functions to:
determine properties of a reservoir formation for a multistage stimulation treatment to be performed along a wellbore drilled within a reservoir formation;
determine properties of a treatment fluid to be injected into the reservoir formation during each stage of the multistage stimulation treatment along the wellbore, based on a treatment plan for the multistage stimulation treatment, the treatment fluid including a fracturing fluid and a proppant;
apply the respective properties of the reservoir formation and the treatment fluid as inputs to a proppant transport model to determine a proppant profile for a fractured area of the reservoir formation corresponding to each stage of the multistage stimulation treatment along the wellbore;
determine a proppant pack conductivity for each stage of the multistage stimulation treatment, based on a proppant conductivity model and the proppant profile determined for that stage;
estimate a rate of hydrocarbon production expected from the wellbore, based on a well production model and the proppant pack conductivity determined for each stage of the multistage stimulation treatment;
determine a distribution of proppant to be injected into the reservoir formation during the multistage stimulation treatment along the wellbore, based on the estimated rate of hydrocarbon production and one or more constraints specified by the treatment plan for the multistage stimulation treatment; and
control injection of proppant along the wellbore as each stage of the multistage stimulation treatment is performed according to the treatment plan and the determined distribution of the proppant.

11. The system of claim 10, wherein the properties of the reservoir formation are determined based on measurements collected by one or more downhole tools disposed within the wellbore.

12. The system of claim 10, wherein the properties of the treatment fluid are selected from the group consisting of: a treatment fluid volume; a proppant type; a proppant mass; a proppant size; a proppant shape; a proppant distribution; and a proppant injection rate.

13. The system of claim 10, wherein the one or more constraints are selected from the group consisting of: a duration of the multistage stimulation treatment; one or more proppant types; a maximum proppant mass; a maximum proppant mass; a range of proppant injection rates for each stage; a minimum proppant amount per stage; and a maximum proppant amount per stage.

14. The system of claim 10, wherein each stage of the multistage stimulation treatment corresponds to a fracture to be produced in an area of the reservoir formation surrounding a portion of the wellbore corresponding to that stage of multistage stimulation treatment.

15. The system of claim 14, wherein the proppant profile includes an amount and a placement of the proppant within the corresponding fracture for each stage of the multistage stimulation treatment along the wellbore.

16. The system of claim 14, wherein the proppant conductivity model correlates the proppant pack conductivity to flow characteristics of the reservoir formation and proppant to be injected at each stage of the multistage stimulation treatment along the wellbore.

17. The system of claim 14, wherein the well production model correlates the rate of hydrocarbon production with treatment parameters associated with the fractured area of the reservoir formation corresponding to each stage of the multistage stimulation treatment along the wellbore.

18. The system of claim 17, wherein the treatment parameters are selected from the group consisting of: wellbore characteristics; fracture characteristics; reservoir fluid properties; a production schedule; and a choke schedule.

19. A non-transitory computer-readable storage medium having instructions stored therein, which when executed by a computer cause the computer to perform a plurality of functions, including functions to:
determine properties of a reservoir formation for a multistage stimulation treatment to be performed along a wellbore drilled within a reservoir formation;
determine properties of a treatment fluid to be injected into the reservoir formation during each stage of the multistage stimulation treatment along the wellbore, based on a treatment plan for the multistage stimulation treatment, the treatment fluid including a fracturing fluid and a proppant;
apply the respective properties of the reservoir formation and the treatment fluid as inputs to a proppant transport model to determine a proppant profile for a fractured area of the reservoir formation corresponding to each stage of the multistage stimulation treatment along the wellbore;
determine a proppant pack conductivity for each stage of the multistage stimulation treatment, based on a proppant conductivity model and the proppant profile determined for that stage;
estimate a rate of hydrocarbon production expected from the wellbore, based on a well production model and the proppant pack conductivity determined for each stage of the multistage stimulation treatment;
determine a distribution of proppant to be injected into the reservoir formation during the multistage stimulation treatment along the wellbore, based on the estimated rate of hydrocarbon production and one or more constraints specified by the treatment plan for the multistage stimulation treatment; and
control injection of proppant along the wellbore as each stage of the multistage stimulation treatment is performed according to the treatment plan and the determined distribution of the proppant.

20. The non-transitory computer-readable storage medium of claim 19, wherein the properties of the reservoir formation are determined based on measurements collected by one or more downhole tools disposed within the wellbore.

* * * * *